(12) United States Patent
Chatani et al.

(10) Patent No.: US 11,692,344 B2
(45) Date of Patent: Jul. 4, 2023

(54) FIREPROOF COATED STRUCTURE FOR PENETRATION PART

(71) Applicant: YOSHINO GYPSUM CO., LTD., Tokyo (JP)

(72) Inventors: Yukiko Chatani, Chiyoda-ku (JP); Mariko Seki, Chiyoda-ku (JP); Takahiro Hebiishi, Chiyoda-ku (JP); Eiichi Kuroda, Chiyoda-ku (JP); Wataru Ohuchi, Chiyoda-ku (JP); Takuji Yamashita, Chiyoda-ku (JP); Kouji Yamakata, Chiyoda-ku (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 16/771,882

(22) PCT Filed: Dec. 20, 2018

(86) PCT No.: PCT/JP2018/047034
§ 371 (c)(1),
(2) Date: Jun. 11, 2020

(87) PCT Pub. No.: WO2019/124505
PCT Pub. Date: Jun. 27, 2019

(65) Prior Publication Data
US 2021/0071415 A1 Mar. 11, 2021

(30) Foreign Application Priority Data
Dec. 21, 2017 (JP) .................................. 2017-245528

(51) Int. Cl.
*E04B 1/94* (2006.01)
*E04B 2/70* (2006.01)

(52) U.S. Cl.
CPC .............. *E04B 1/948* (2013.01); *E04B 1/943* (2013.01); *E04B 1/945* (2013.01); *E04B 2/706* (2013.01)

(58) Field of Classification Search
CPC .......... E04B 1/943; E04B 1/945; E04B 1/948; E04B 2/706
(Continued)

(56) References Cited

U.S. PATENT DOCUMENTS 1,541,756 A * 6/1925 Williams .................. F16L 5/08
174/99 R
1,851,939 A * 3/1932 Williams .................. H02G 9/06
174/99 R
(Continued)

FOREIGN PATENT DOCUMENTS

AT         385899 B * 5/1988 ............. A62C 2/065
CN      1063736 A     8/1992
(Continued)

OTHER PUBLICATIONS

International Search Report dated Feb. 5, 2019 from International Patent Application No. PCT/JP2018/047034, 2 pages.
(Continued)

*Primary Examiner* — Brian D Mattei
*Assistant Examiner* — Joseph J. Sadlon
(74) *Attorney, Agent, or Firm* — Staas & Halsey LLP (57) ABSTRACT

A fireproof covered structure for covering a penetration part formed in a fireproof beam of a wooden building to make the penetration part fireproof, wherein a tubular fireproof covering material is attached to the penetration part while covering an inner peripheral surface of the penetration part. The tubular fireproof covering material is formed by stacking a plurality of gypsum board pieces cut out from commercially available gypsum boards of thicknesses of 9.5 mm
(Continued)

to 25.5 mm, in the thickness direction and unitarily connecting the gypsum board pieces. The tubular fireproof covering material is inserted into and attached to the penetration part such that a connecting portion That connects gypsum board pieces That are adjacent in the stacking direction is disposed at a boundary portion between a structural member and a covering member of the fireproof beam, or at a portion close to the boundary portion.

20 Claims, 6 Drawing Sheets (58) Field of Classification Search
USPC ................................................. 52/396.01
See application file for complete search history.

(56) References Cited

U.S. PATENT DOCUMENTS

| | | | | |
|---|---|---|---|---|
| 3,272,521 A * | 9/1966 | McNenny | F16J 15/3236 | 277/467 |
| 4,061,344 A * | 12/1977 | Bradley | E04B 1/947 | 277/606 |
| 4,071,992 A * | 2/1978 | Becker | E04C 2/34 | 52/783.17 |
| 4,086,736 A * | 5/1978 | Landrigan | F16L 5/04 | 248/56 |
| 4,090,340 A * | 5/1978 | Becker | E04B 1/945 | 52/793.1 |
| 4,109,423 A | 8/1978 | Perrain | | |
| 4,135,055 A * | 1/1979 | Beckers | A62C 3/16 | 174/505 |
| 4,219,173 A * | 8/1980 | Forbes | F16L 5/04 | 285/47 |
| 4,302,917 A * | 12/1981 | Fermvik | H02G 1/00 | 52/220.8 |
| 4,336,416 A * | 6/1982 | Goodsell | H02G 3/185 | 439/573 |
| 4,337,603 A * | 7/1982 | Davidson | E04F 17/08 | 52/220.8 |
| 4,432,465 A * | 2/1984 | Wuertz | E04B 1/947 | 138/89 |
| 4,567,705 A * | 2/1986 | Carlson | E04B 1/942 | 52/576 |
| 4,663,204 A * | 5/1987 | Langham | B32B 3/30 | 428/920 |
| 4,748,787 A * | 6/1988 | Harbeke | F16L 5/04 | 264/31 |
| 4,901,488 A * | 2/1990 | Murota | F16L 5/04 | 52/232 |
| 5,105,592 A * | 4/1992 | MacMillan | F16L 5/04 | 52/232 |
| 5,174,077 A | 12/1992 | Murota | | |
| 5,297,691 A * | 3/1994 | Bottcher | E04B 5/48 | 220/88.1 |
| 5,344,106 A * | 9/1994 | Beele | A62C 2/06 | 248/56 |
| 5,351,448 A * | 10/1994 | Gohlke | A62C 2/065 | 52/1 |
| 5,398,467 A * | 3/1995 | Ricq | A62C 2/065 | 169/48 |
| 5,452,551 A * | 9/1995 | Charland | A62C 2/065 | 52/220.8 |
| 5,458,343 A * | 10/1995 | Dornfeld | F16L 5/08 | 277/503 |
| 5,548,934 A * | 8/1996 | Israelson | A62C 2/065 | 52/220.8 |
| 5,625,996 A * | 5/1997 | Bechtel | E04C 3/18 | 52/843 |
| 5,738,924 A * | 4/1998 | Sing | B32B 3/20 | 428/116 |
| 5,941,070 A * | 8/1999 | Oldham | F01N 13/1811 | 60/322 |
| 5,985,385 A * | 11/1999 | Gottfried | F16L 59/145 | 428/920 |
| 6,182,407 B1 * | 2/2001 | Turpin | E04B 1/942 | 52/784.11 |
| 6,305,133 B1 * | 10/2001 | Cornwall | E04B 1/942 | 524/439 |
| 6,574,930 B2 * | 6/2003 | Kiser | B32B 7/02 | 52/232 |
| 6,725,615 B1 | 4/2004 | Porter | | |
| 6,831,118 B2 * | 12/2004 | Munzenberger | E04B 1/942 | 524/439 |
| 6,848,227 B2 * | 2/2005 | Whitty | H02G 3/22 | 174/482 |
| 8,291,662 B2 * | 10/2012 | McCorkle | E04B 1/483 | 52/396.04 |
| 8,640,429 B1 * | 2/2014 | Watts | E04C 3/28 | 52/838 |
| 8,833,478 B2 * | 9/2014 | Zernach | A62C 3/16 | 52/220.8 |
| 8,898,974 B1 * | 12/2014 | Gardner | H02G 3/00 | 52/220.8 |
| 8,915,033 B2 * | 12/2014 | Daniels | C04B 28/14 | 52/232 |
| 9,027,296 B2 * | 5/2015 | Daniels | C04B 20/0048 | 52/232 |
| 9,168,403 B2 * | 10/2015 | Paetow | F16L 5/04 | |
| 9,220,932 B2 * | 12/2015 | Zernach | A62C 2/065 | |
| 9,246,315 B2 * | 1/2016 | Boyd | H05K 5/069 | |
| 9,464,436 B2 * | 10/2016 | Malakauskas | E04B 1/35 | |
| 9,677,268 B2 * | 6/2017 | Knight | E04B 1/7608 | |
| 9,682,527 B2 * | 6/2017 | Yasaee | B32B 27/12 | |
| 9,722,404 B2 * | 8/2017 | Beele | A62C 2/065 | |
| 9,933,091 B2 * | 4/2018 | Tanaka | A62C 2/065 | |
| 10,094,484 B2 * | 10/2018 | Keith | F16K 31/002 | |
| 10,100,514 B2 * | 10/2018 | Klein | E04B 2/82 | |
| 10,519,652 B2 * | 12/2019 | Klein | E04B 1/947 | |
| 10,571,067 B2 * | 2/2020 | Schlytter-Henrichsen | A62C 2/065 | |
| 10,709,917 B2 * | 7/2020 | An | A62C 35/15 | |
| 2001/0001355 A1 * | 5/2001 | Shimizu | F16L 5/04 | 52/220.1 |
| 2002/0056242 A1 | 5/2002 | Andresen | | |
| 2003/0172603 A1 * | 9/2003 | McKesson | H02G 3/0412 | 52/220.8 |
| 2006/0070319 A1 * | 4/2006 | Flynn | F16L 5/04 | 52/220.8 |
| 2009/0044484 A1 * | 2/2009 | Berger | E04C 2/12 | 156/182 |
| 2009/0044486 A1 * | 2/2009 | Kimura | E04B 1/943 | 52/831 |
| 2009/0148660 A1 * | 6/2009 | Cooper | E04C 3/065 | 428/137 |
| 2010/0238670 A1 * | 9/2010 | Moench | E04B 9/006 | 362/365 |
| 2011/0018206 A1 | 1/2011 | Beele | | |
| 2011/0314755 A1 * | 12/2011 | Langille | B32B 27/06 | 156/92 |
| 2013/0118764 A1 * | 5/2013 | Porter | B32B 5/022 | 169/48 |
| 2013/0278016 A1 | 10/2013 | Kia et al. | | |
| 2014/0000193 A1 * | 1/2014 | Daniels | E06B 5/161 | 52/784.11 |
| 2019/0145098 A1 | 5/2019 | Geyer et al. | | |
| 2019/0169837 A1 * | 6/2019 | Conboy | A62C 3/0214 | |
| 2019/0177971 A1 * | 6/2019 | Outram | C08L 75/04 | |
| 2020/0115896 A1 * | 4/2020 | Albers | F16L 57/04 | |

FOREIGN PATENT DOCUMENTS

| | | |
|---|---|---|
| CN | 1338585 A | 3/2002 |
| CN | 1349600 A | 5/2002 |
| CN | 201391684 Y | 1/2010 |
| CN | 101802472 A | 8/2010 |
| CN | 102245950 A | 11/2011 |
| CN | 202483024 U | 10/2012 |
| CN | 103375677 A | 10/2013 |
| CN | 104153475 A | 11/2014 |

(56) References Cited

FOREIGN PATENT DOCUMENTS

| | | |
|---|---|---|
| CN | 204828966 U | 12/2015 |
| CN | 204828967 U | 12/2015 |
| CN | 205134742 U | 4/2016 |
| CN | 105863092 A | 8/2016 |
| CN | 206599936 U | 10/2017 |
| CN | 107476447 A | 12/2017 |
| CN | 107849843 A | 3/2018 |
| EP | 0 002 494 A1 | 6/1979 |
| EP | 0 164 416 A1 | 12/1985 |
| EP | 662578 A1 * | 7/1995 ............. A62C 2/065 |
| EP | 2 087 925 A3 | 9/2009 |
| EP | 2339708 A2 | 6/2011 |
| GB | 514267 A * | 11/1939 ............. E04B 1/944 |
| JP | 7-127766 | 5/1995 |
| JP | 4533006 | 8/2010 |
| JP | 2016-65431 | 4/2016 |
| JP | 2016-186164 | 10/2016 |
| JP | 2017-75458 | 4/2017 |
| JP | 2017-122322 A | 7/2017 |
| KR | 20100070509 A | 6/2010 |
| RU | 132 832 U1 | 9/2013 |
| WO | WO-9607453 A1 * | 3/1996 ............. A62C 2/065 |
| WO | 2017/194558 A2 | 11/2017 |

OTHER PUBLICATIONS

Nagaoka T, et al., "Fire resistant structural unit i.e. cross-beam, for wooden building, has fireproof layer covering internal surface of through-hole, and reinforcement layer provided inside fireproof layer for raising fire resistance of fireproof layer", WPI / 2017 Clarivate Analytics, Apr. 20, 2017, vol. 2017, Nr: 29, 1 p.

Igarashi S et al., "Structural member e.g. cross beam for supporting floor slab of reinforced concrete, has pipe for burn prevention provided around through hole of wooden member, and steel plate which pays shear force acted around through hole", WPI / 2017 Clarivate Analytics, Apr. 28, 2016, vol. 2016, Nr: 32, 1 p.

\* cited by examiner

FIREPROOF COATED STRUCTURE FOR PENETRATION PART

CROSS-REFERENCE TO RELATED APPLICATIONS

This application is a U.S. National Stage Application which claims the benefit under 35 U.S.C. § 371 of International Patent Application No. PCT/JP2018/047034 filed on Dec. 20, 2018, which claims foreign priority benefit under 35 U.S.C. § 119 of Japanese Patent Application No. 2017-245528 filed on Dec. 21, 2017 in the Japanese Intellectual Property Office, the contents of both of which are incorporated herein by reference.

TECHNICAL FIELD

The present invention relates to a fireproof covered structure for penetration part, and particularly to a fireproof covered structure for covering a penetration part formed in a fire prevention section forming member of a wooden building, or a penetration part formed in a fireproof constructional member of a wooden building, to make the penetration part fireproof.

BACKGROUND ART

Fire prevention sections of a wooden building are wall members (hereinafter referred to as "fire prevention section forming members"), such as flooring, walls, ceilings, and fire prevention doors, that are arranged around sections into which the building is divided using flooring, walls, ceilings, fire prevention doors, and the like of a fireproof structure in order to, if a fire occurs within the building, contain the fire to a limited area and prevent the fire from spreading to other sections. There are cases where penetration parts through which a pipe, a wire, or the like is to be passed need to be formed in the fire prevention section forming members, and a structure for forming a penetration part in a fire prevention section forming member as shown in, for example, FIGS. 7(a) and 7(b) is widely used.

Figure 7A:
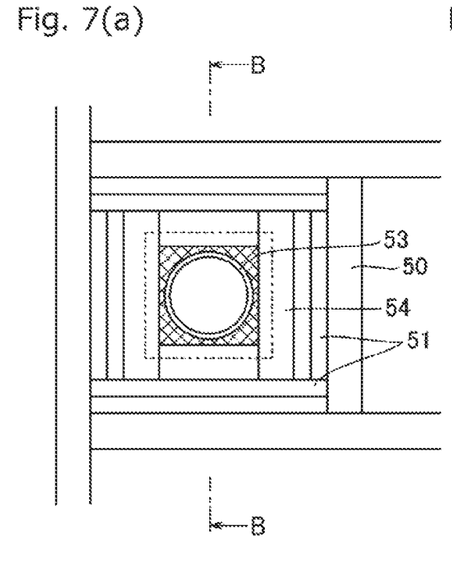
Figure 7B:
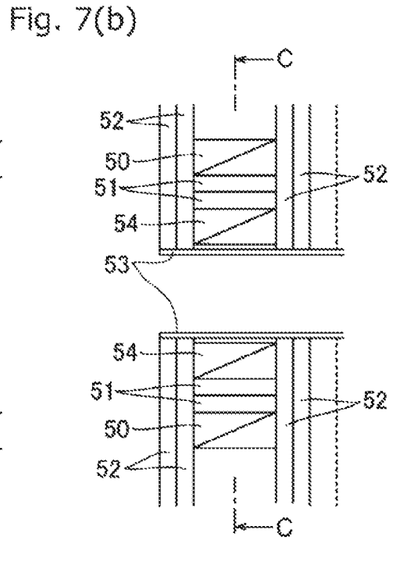

In the structure for forming a penetration part in a fire prevention section forming member shown in FIGS. 7(a) and 7(b), a wooden frame 50 is assembled and fitted in advance to a wall or floor at a position at which a penetration part needs to be formed, and the inner periphery of the wooden frame 50 is covered with fireproof covering materials 51 such as gypsum boards, and at the same time, fireproof covering materials 52 such as gypsum boards are attached to the surface of the wall or floor around the penetration part. Then, a pipe 53 made of vinyl chloride, steel, or the like is passed through the wooden frame 50 preferably while being supported by a support member 54. A penetration part formed by the pipe 53 is thereby formed.

Also, for example, in Japanese wooden buildings, a design where the wood surface of wooden beams and posts, which are constructional members, is exposed to the interior of a room, such as that of a traditional "shinkabe-zukuri" structure in which wooden beams and posts are exposed, is a popular design. The design in which the wood surface of wooden beams and posts is exposed to the interior of a room can be made to have desired fireproof by using a burning margin design. However, in the case where a penetration part is formed in a beam or post with a burning margin design as described above, fireproof may be lost at the penetration part, allowing fire to spread to the surroundings from the penetration part, and affecting the supporting force of a load supporting layer included in the beam or post with a burning margin design.

Figure 8A:
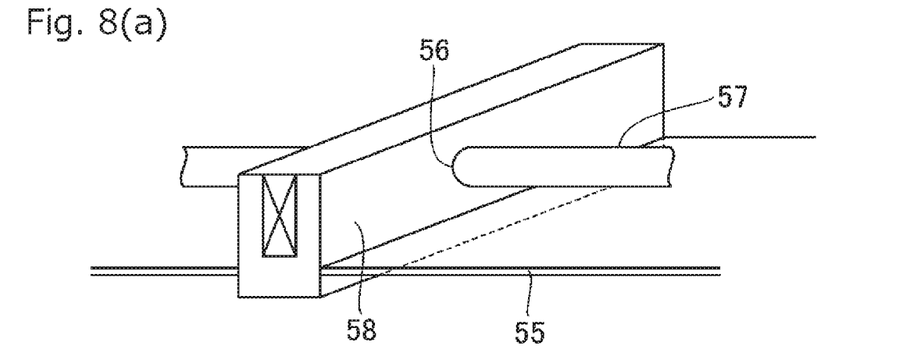
FIGS. 8(a) and 8(b) are schematic perspective views showing examples of a conventional structure for passing a pipe through a fireproof beam that is designed to have a burning margin.
Figure 8B:
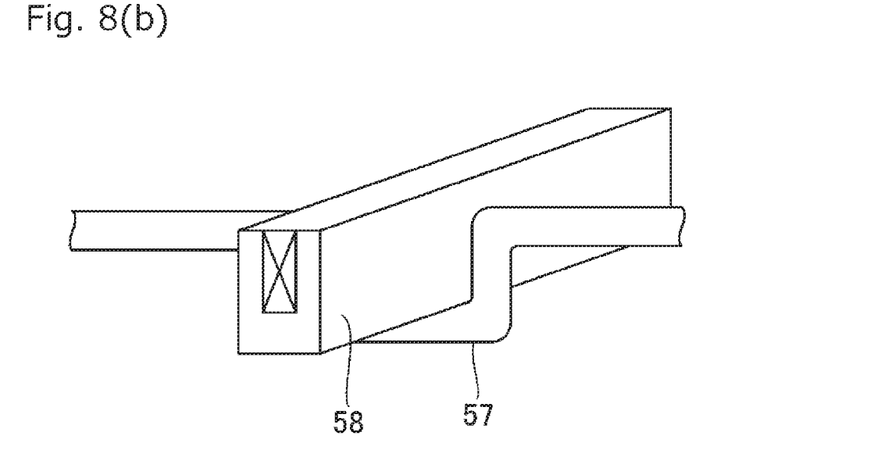

For this reason, as shown in FIGS. 8(a) and 8(b), for example, in the case where a pipe 57 is to be passed through a beam 58 that is designed to have a burning margin, a method in which a penetration part 56 is formed in the beam 58 in a ceiling space above a fireproof ceiling cover 55 and the pipe 57 is passed through the penetration part (see FIG. 8(a)) or a method in which the pipe 57 is installed along outer peripheral surfaces of the beam 58 instead of forming a penetration part in the beam 58 (see FIG. 8(b)) is used. However, the method in which the penetration part 56 is provided in the ceiling space above the ceiling cover 55 reduces the area of a portion of the beam 58 that is exposed to the interior of a room, and the method in which the pipe 57 is installed along the outer peripheral surfaces of the beam 58 degrades the appearance. Thus, both methods are detrimental to the aesthetic design of the beam as a beam that is exposed to the interior of a room.

To address this issue, a fireproof wooden constructional member that prevents fire from spreading to the surroundings from a penetration part has been proposed (see, for example, Patent Literature 1). In the wooden constructional member disclosed in Patent Literature 1, a tubular member that is made of, for example, mortar and acts as a firestop portion is inserted into and installed in a penetration part that extends through a beam so that the tubular member covers the inner circumferential surface of the penetration part, and a gap between the inner circumferential surface of the penetration part and the outer circumferential surface of the tubular member is filled with a filling material made of a fireproof material such as mortar. Patent Literature 1 also discloses that, other than mortar, gypsum, calcium silicate, or the like can be used as a large heat capacity material that can be used to form a firestop portion and can absorb heat.

CITATION LIST

Patent Literature

Patent Literature 1: JP 6014320B

SUMMARY OF INVENTION

However, in the above-described conventional fireproof covered structure for penetration part that prevents fire from spreading to the surroundings from a penetration part, the tubular member provided in the penetration part is formed by casting, for example, a firestop material such as mortar, gypsum, or calcium silicate into a tubular mold, and then curing the firestop material. For this reason, sufficient dimensional accuracy cannot be obtained, and particularly when a penetration part that extends through a fireproof constructional member of a wooden building is to be covered for fireproof, it may be difficult to snugly fit the tubular member into the penetration part.

In addition, a tubular molding mold that conforms to the shape of a penetration part needs to be formed each time, which increases the production cost.

Furthermore, in the case where the fireproof constructional member of a wooden building includes, for example, a structural member that serves as a load supporting layer and a covering member that is disposed to cover a surface of the structural member and serves as a burning margin layer, and the penetration part is formed intersecting a boundary portion between the structural member and the covering member, if a height difference is generated at the boundary portion between the structural member and the covering member due to differences in behavior caused when the two members dry and contract, and differences in behavior caused when the two members support a load, a tubular fireproof covering material, which is the tubular member formed by using mortar, gypsum, calcium silicate, or the like is likely to crack at this height difference and is likely to no longer function as a firestop layer.

It is an object of the present invention to provide a fireproof covered structure for penetration part with which a tubular fireproof covering material that is to be installed in a penetration part and function as a firestop layer can be formed accurately and economically, and therefore the fireproof covered structure for penetration part can be formed easily and at a low cost.

The present invention achieves the above-described object by providing a fireproof covered structure for penetration part, the structure covering a penetration part formed in a fire prevention section forming member of a wooden building, or a penetration part formed in a fireproof constructional member of a wooden building, to make the penetration part fireproof, wherein a tubular fireproof covering material is attached to the penetration part while covering an inner peripheral surface of the penetration part, and the tubular fireproof covering material is formed to have a tubular shape by stacking a plurality of gypsum board pieces in a thickness direction and unitarily connecting the plurality of gypsum board pieces.

It is preferable that, in the fireproof covered structure for penetration part of the present invention, the plurality of gypsum board pieces are annular gypsum board pieces.

Moreover, it is preferable that, in the fireproof covered structure for penetration part of the present invention, the plurality of gypsum board pieces are cut out from gypsum boards of thicknesses of 9.5 mm to 25.5 mm.

Moreover, it is preferable that, in the fireproof covered structure for penetration part of the present invention, the plurality of gypsum board pieces are stacked and unitarily connected to form the tubular fireproof covering material by being fixed to each other using metal fasteners.

Moreover, it is preferable that, in the fireproof covered structure for penetration part of the present invention, the gypsum board pieces are ring-shaped gypsum board pieces, and the tubular fireproof covering material is a cylindrical fireproof covering material.

Moreover, it is preferable that, in the fireproof covered structure for penetration part of the present invention, the fireproof constructional member includes a structural member that serves as a load supporting layer and a covering member that is disposed to cover a surface of the structural member and serves as a burning margin layer, the penetration part is opened to intersect a boundary portion between the structural member and the covering member, and the tubular fireproof covering material that is formed by stacking the gypsum board pieces is inserted into and attached to the penetration part such that a connecting portion that connects the gypsum board pieces that are adjacent to one another in a stacking direction is disposed at the boundary portion between the structural member and the covering member, or at a portion close to the boundary portion.

Moreover, it is preferable that, in the fireproof covered structure for penetration part of the present invention, the fireproof constructional member is a fireproof beam, the fireproof beam including a structural member that serves as a load supporting layer and a pair of covering members that are disposed to cover two side faces of the structural member and serve as burning margin layers, the penetration part being opened to intersect two boundary portions between the structural member and the covering members, and the tubular fireproof covering material that is formed by stacking the gypsum board pieces being inserted into and attached to the penetration part such that two connecting portions that connect the gypsum board pieces that are adjacent to one another in a stacking direction are disposed at the two boundary portions between the structural member and the covering members, or at portions close to the two boundary portions.

BRIEF DESCRIPTION OF DRAWINGS

FIG. 7 shows an example of a conventional structure for forming a penetration part in a fire prevention section forming member, with FIG. 7(a) being a schematic cross-sectional view taken along the line C-C shown in FIG. 7(b), and FIG. 7(b) being a schematic cross-sectional view taken along the line B-B shown in FIG. 7(a).

DESCRIPTION OF EMBODIMENTS

Figure 1:
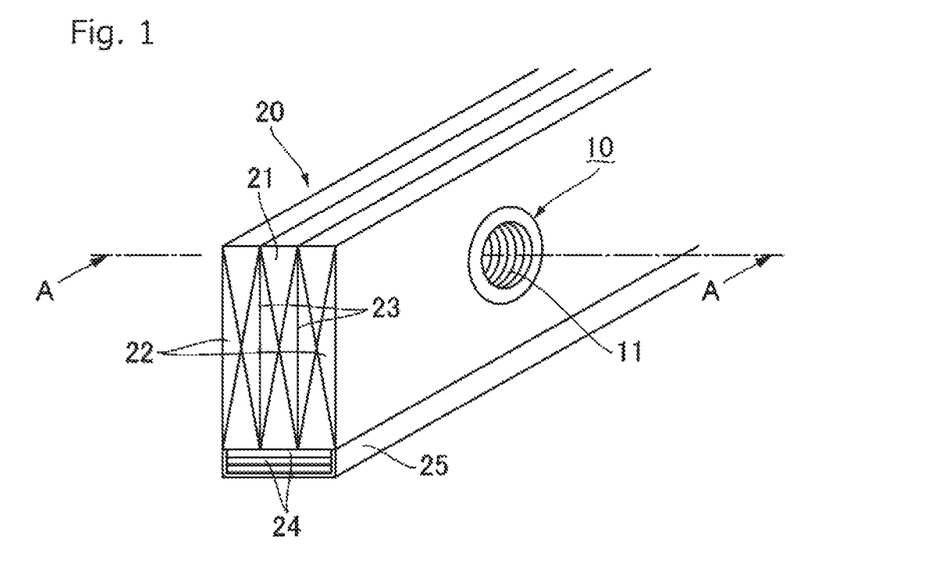
FIG. 1 is a schematic perspective view of a fireproof beam that is a fireproof constructional member and has a penetration part covered for fireproof by a fireproof covered structure for penetration part according to a preferred embodiment of the present invention.
Figure 2:
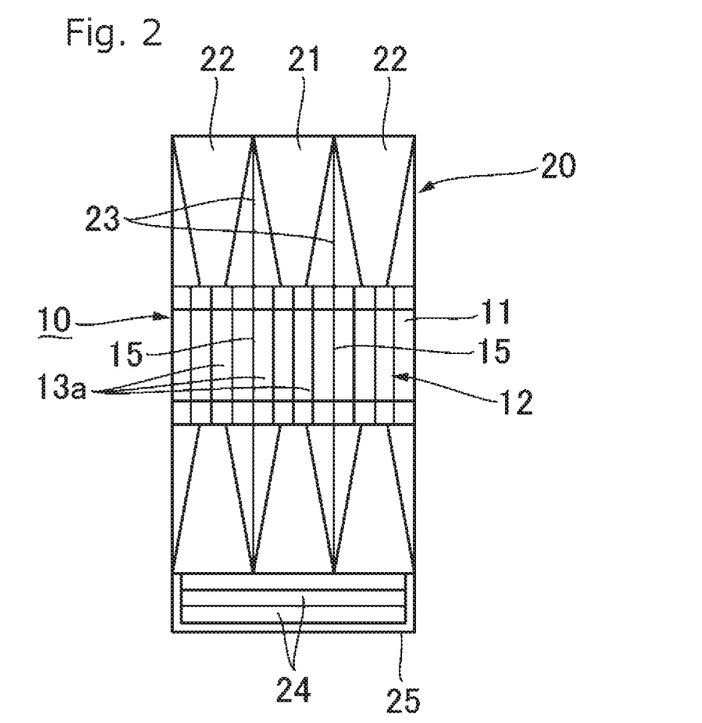
FIG. 2 is a cross-sectional view taken along the line A-A shown in FIG. 1.

As shown in FIGS. 1 and 2, a fireproof covered structure 10 for a penetration part according to a preferred embodiment of the present invention is used when forming a penetration part 11 through which, for example, a pipe or a wire is to be passed in, for example, a fireproof beam 20 that is a fireproof constructional member that constitutes a wooden building, to cover the inner circumferential surface of the penetration part 11 to make it fireproof, so as to effectively avoid a situation in which the fireproof of the fireproof beam 20 is lost at the penetration part 11, affecting the supporting force of a load supporting layer included in the fireproof beam 20 that is designed to have a burning margin. The fireproof covered structure 10 according to the present embodiment makes it possible that a tubular fireproof covering material 12 that is to be installed in a penetration part 11 can be formed easily, accurately, and economically by preferably using commercially available gypsum boards, and has a function of effectively preventing cracking or the like from occurring in the tubular fireproof covering material 12 in the penetration part 11, where the tubular fireproof covering material 12 is installed, and thereby stably keeping the penetration part 11 fireproof.

Figure 3A:
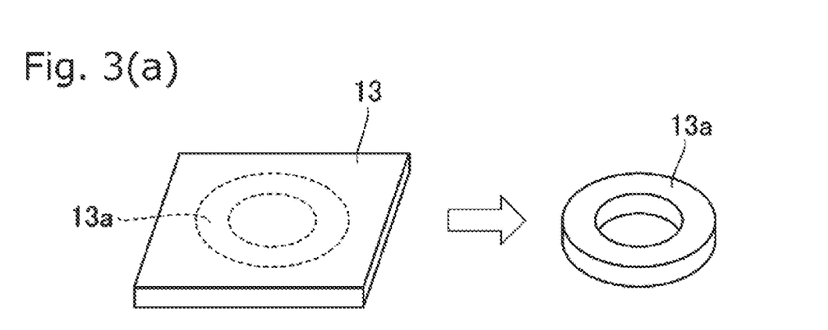
FIGS. 3(a) and 3(b) are schematic perspective views illustrating the step of forming a tubular fireproof covering material.
Figure 3B:
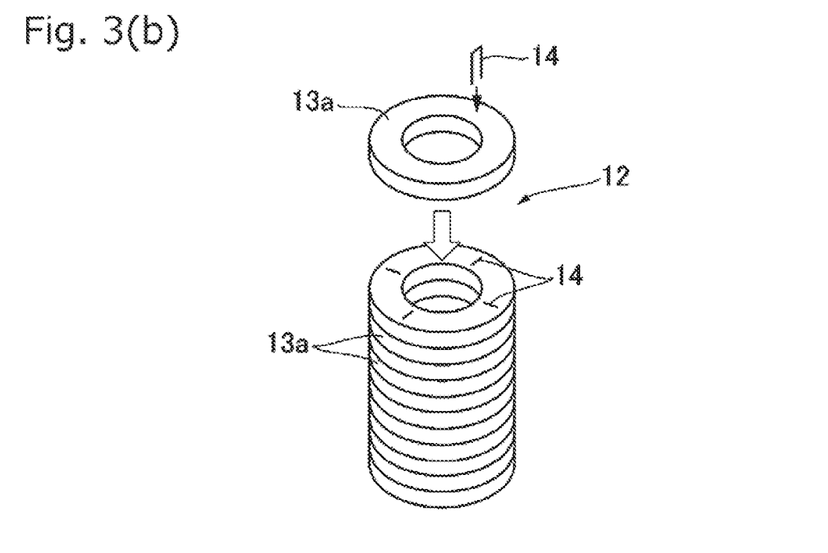

Also, the fireproof covered structure 10 for a penetration part according to the present embodiment is, for example, as shown in FIGS. 1 and 2, a fireproof covered structure for covering a penetration part 11 formed in a fireproof beam 20 that is a fireproof constructional member of a wooden building to make the penetration part 11 fireproof, and a tubular fireproof covering material 12 is attached to the penetration part 11 while covering the inner circumferential surface of the penetration part 11. As shown in FIGS. 3(a) and 3(b), the tubular fireproof covering material 12 is formed to have a tubular shape by stacking a plurality of gypsum board pieces 13a that are preferably annular gypsum board pieces in a thickness direction and unitarily connecting the plurality of gypsum board pieces 13a.

Also, in the present embodiment, the plurality of annular gypsum board pieces 13a are preferably ring-shaped gypsum board pieces that are cut out from commercially available gypsum boards 13 of thicknesses of 9.5 mm to 25.5 mm. The plurality of ring-shaped annular gypsum board pieces 13a are stacked and unitarily connected to form a cylindrical tubular fireproof penetration part covering material 12 by being fixed to each other using metal fasteners, preferably staples 14 (see FIG. 3(b)).

Furthermore, in the present embodiment, as shown in FIGS. 1 and 2, the fireproof beam 20 includes a structural member 21 that serves as a load supporting layer and a pair of covering members 22 that are disposed on two side faces of the structural member 21 to cover the side faces and serve as burning margin layers. The penetration part 11 is opened to preferably perpendicularly or substantially perpendicularly intersect two boundary portions 23 between the structural member 21 and the covering members 22. The tubular fireproof covering material 12 in which the annular gypsum hoard pieces 13a are stacked is inserted into and attached to the penetration part 11 such that connecting portions 15 that connect annular gypsum board pieces 13a that are adjacent to one another in the stacking direction are disposed at the two boundary portions 23 between the structural member 21 and the covering members 22 of the fireproof beam 20, or at portions close to the boundary portions 23. Here, the covering members 22 function not only as burning margin layers, but also as firestop layers. The structural member 21 covered by the wooden covering members 22 that function as burning margin layers can be deemed as a structural member 22 covered by the wooden firestop covering members 22.

In the present embodiment, the fireproof beam 20 is preferably a fireproof beam that is designed to have a burning margin and has fireproof performance corresponding to or superior to that of a 45 minute quasi-fireproof structure. That is, the fireproof beam 20 includes: a structural member 21 that has, for example, an elongated rectangular cross-sectional shape with a height of about 560 mm and a width of about 105 mm and functions as a structural beam material; a pair of covering members 22 that are disposed to cover the side faces of the structural beam material 21, have, for example, an elongated rectangular cross-sectional shape with a height of about 560 mm and a width of about 105 mm as with the structural member 21, and function as additional beam materials for a burning margin; and a fireproof covering material 24 that is attached to continuously cover the lower surface of the structural member 21 and the lower surfaces of the covering members 22 that are disposed on two sides. The fireproof covering material 24 has a function of protecting the wooden material covered by the fireproof covering material 24 from being burnt and damaged for 45 minutes or more in case of a fire and a function of protecting the same from being thermally degraded, and has a three-layer structure composed of, for example, gypsum boards or the like. Also, a decorative wooden board 25 is attached to cover the outer peripheral surface of the fireproof covering material 24, excluding the surface covering the structural member 21 and the covering members 22.

Here, the structural member 21 and the pair of covering members 22 that constitute the fireproof beam 20 may be unitarily connected using an adhesive, nails, screws, or the like. However, in the present embodiment, the structural member 21 and the pair of covering members 22 are preferably formed as a unitary body without being connected. Accordingly, in the structural member 21 and the pair of covering members 22, a height difference is likely to be generated at each boundary portion 23 on the inner circumferential surface of the penetration part 11, which is opened to intersect the boundary portions 23, due to differences in behavior caused when the structural member 21 and the covering members 22 dry and contract and when they support a load. In the present embodiment, the tubular fireproof covering material 12 is formed by stacking and unitarily connecting a plurality of annular gypsum board pieces 13a by fixing the gypsum board pieces 13a to each other preferably using staples 14 as metal fasteners, and thus, as will be described later, the influence of height differences generated at the boundary portions 23 can be absorbed by the connecting portions 15.

In the present embodiment, the tubular fireproof covering material 12 that is inserted into and attached to the penetration part 11 of the fireproof beam 20 is formed to have a cylindrical shape by stacking a plurality of ring-shaped annular gypsum board pieces 13a in the thickness direction, the gypsum board pieces 13a being preferably formed from gypsum boards 13 of thicknesses of 9.5 mm to 25.5 mm as shown in FIGS. 3(a) and 3(b), and unitarily connecting the plurality of ring-shaped annular gypsum board pieces 13a. The gypsum boards 13 are pieces of construction material obtained by wrapping a plate-shaped material composed mainly of gypsum in gypsum board base paper, and are known as pieces of material that have high thermal insulation and sound insulation. As the gypsum boards 13, any commercially available gypsum boards that are on the market as inexpensive plate-shaped members and are easily obtainable can be used. As the gypsum boards 13, "gypsum boards", "reinforced gypsum boards", "regular hard gypsum boards", or the like with thicknesses of 9.5 mm, 12.5 mm, 15 mm, 16 mm, 18 mm, 21 mm, and 25 mm specified by JIS A 6901-2014 may be used. In the case where the gypsum boards 13 have the same thickness, it is preferable to use reinforced gypsum boards that are highly fireproof as the gypsum boards 13. According to JIS A 6901-2014, the tolerance of the thickness of a gypsum board is 0 mm to 0.5 mm. For example, for a 25 mm-thick gypsum board, a gypsum board having a thickness of 25 mm to 25.5 mm is allowed. Furthermore, a gypsum board 13 can be accurately and easily cut out to have a desired shape using, for example, a known cutting tool such as a router.

In the present embodiment, the plurality of annular gypsum board pieces 13a are formed by, for example, cutting commercially available gypsum boards 13 into, for example, a ring-shaped (doughnut shaped) planar shape with, for example, an inner diameter of about 115 mm and an outer diameter of about 195 mm, using a router. A cylindrical tubular fireproof covering material 12 is formed by stacking a plurality of (in the present embodiment, twelve) cut-out ring-shaped annular gypsum board pieces 13a in the thickness direction and unitarily connecting them, preferably in such a manner that sheets of gypsum board base paper (not shown) are attached to two sides of each gypsum board piece 13a.

Here, as a result of the annular gypsum board pieces 13a being stacked in such a manner that sheets of gypsum hoard base paper (not shown) are attached to two sides of each gypsum board piece 13a, the two sides of each annular gypsum board piece 13a are smooth, and the stacking surfaces of the annular gypsum board pieces 13a are smooth, and thus the annular gypsum board pieces 13a can be bonded without a gap. Also, as a result of the annular gypsum board pieces 13a being bonded without a gap using staples or the like, even when the annular gypsum board pieces 13a are stacked with the paper being attached thereto, the fireproof of a tubular fireproof covering material 12 can be ensured. The annular gypsum board pieces 13a may be stacked without the paper being attached to two sides of each gypsum board piece 13a, and unitarily connected.

The plurality of annular gypsum board pieces 13a can be stacked and unitarily connected using a known adhesive, but in the present embodiment, as described above, the plurality of annular gypsum board pieces 13a are stacked and unitarily connected preferably by being fixed to each other using staples 14 (see FIG. 3(b)) as metal fasteners. The staples are wire members that are bent into a squared U shape and known as metal fasteners for fixing gypsum boards. By punching staples through a gypsum board using a tacker (staple gun) that is a tool known as a construction stapler, a gypsum board can be easily fixed to another gypsum board, a support member, and the like. If one staple 14 is passed through, for example, two gypsum boards or more at a time, the gypsum boards may break. Accordingly, in the present embodiment, the staples 14 have a leg length that is about 1.5 to 2 times longer than the thickness of a gypsum board, and are preferably sequentially punched through every two adjacent annular gypsum board pieces 13a of the stacked gypsum board pieces 13a so as to fix twelve annular gypsum board pieces 13a to each other and unitarily connect the gypsum board pieces 13a. Also, in the cylindrical tubular fireproof covering material 12 formed by unitarily connecting twelve ring-shaped annular gypsum board pieces 13a, it is preferable to apply an adhesive such as, for example, an inorganic adhesive Tora Bond (registered trademark, available from Yoshino Gypsum Co., Ltd.) to the outer circumferential surface of the connecting portions 15 of adjacent annular gypsum board pieces 13a so as to increase connection strength and fireproof.

As the metal fasteners 14 for fixing the plurality of gypsum board pieces 13a to each other, in addition to the staples 14, various types of known metal fittings can be used as metal fasteners such as nails, pins, and screws, for example.

In the present embodiment, the cylindrical tubular fireproof covering material 12 formed by unitarily connecting twelve ring-shaped annular gypsum board pieces 13a has, for example, a length of about 300 to 310 mm, which is slightly shorter than the length (315 mm) of the penetration part 11 formed extending through the fireproof beam 20, and also has, for example, an outer diameter of 195 mm, which is slightly smaller than the inner diameter (200 mm) of the penetration part 11.

Here, the tubular fireproof covering material 12 is formed by stacking a plurality of annular gypsum board pieces 13a that are cut out from commercially available gypsum boards 13 of thicknesses of, for example, 9.5 mm, 12.5 mm, 15 mm, 16 mm, 18 mm, 21 mm, and 25 mm, and it is therefore possible to easily adjust the length of the tubular fireproof covering material 12 to a desired length by selecting gypsum boards 13 from which annular gypsum board pieces 13a are to be cut out among a plurality of gypsum boards 13 having different thicknesses as appropriate, and stacking the combination of a plurality of cut-out gypsum board pieces 13a. Also, by selecting gypsum boards 13 from which annular gypsum board pieces 13a are to be cut out from among a plurality of gypsum boards 13 having different thicknesses as appropriate, and stacking the combination of a plurality of cut-out gypsum board pieces 13a, the positions of the connecting portions 15 in the tubular fireproof covering material 12 can be adjusted as appropriate such that, in a state in which the tubular fireproof covering material 12 is inserted into and attached to the penetration part 11 of the fireproof beam 20, two connecting portions 15 out of the connecting portions 15 of all of the adjacent annular gypsum board pieces 13a are disposed at two boundary portions 23 between the structural member 21 and the covering members 22 of the fireproof beam 20, or at portions close to the boundary portions 23.

Figure 4A:
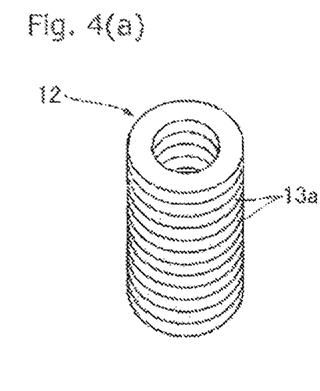
FIGS. 4(a) to 4(d) are schematic perspective views illustrating exemplary embodiments of the tubular fireproof covering material.
Figure 4B:
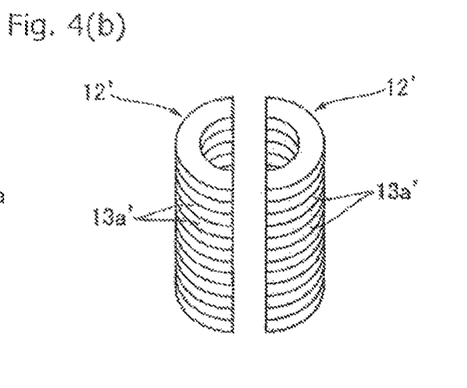
Figures 4C, 4D:
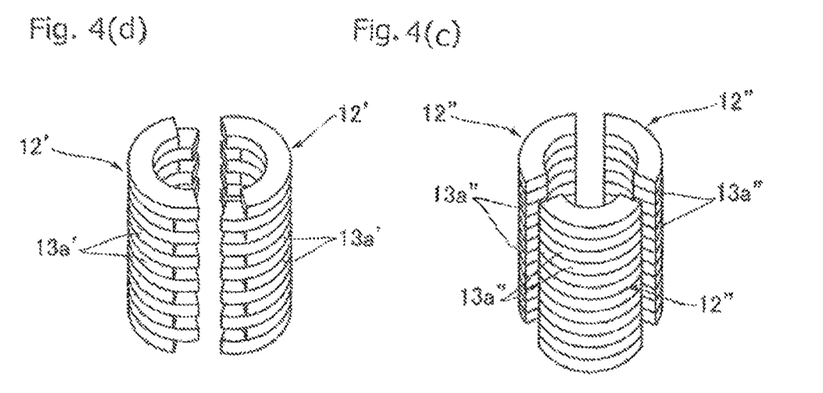

The annular gypsum board pieces 13a that form the tubular fireproof covering material 12 are not necessarily cut out to have a ring-shaped planar shape from commercially available gypsum boards 13 and stacked as shown in FIG. 4(a). As shown in FIG. 4(b), for example, a tubular fireproof covering material 12 in which a plurality of annular gypsum board pieces 13a obtained from gypsum boards 13 are stacked in the thickness direction and unitarily connected (see FIG. 4(a)) may be obtained by stacking gypsum board pieces 13a' that are cut out to have a halved ring shaped planar shape so as to form a divided fireproof covering material 12', and unitarily connecting a plurality of such divided fireproof covering materials 12' in the circumferential direction. As shown in FIG. 4(c), for example, the tubular fireproof covering material 12 in which a plurality of annular gypsum board pieces 13a obtained from gypsum boards 13 are stacked in the thickness direction and unitarily connected (see FIG. 4(a)) may also be obtained by stacking gypsum board pieces 13a" that are cut out to have a trisected ring shaped planar shape so as to form a divided fireproof covering material 12", and unitarily connecting a plurality of such divided fireproof covering materials 12" in the circumferential direction.

Alternatively, as shown in FIG. 4(d), for example, the tubular fireproof covering material 12 in which a plurality of annular gypsum board pieces 13a obtained from gypsum boards 13 are stacked in the thickness direction and unitarily connected (see FIG. 4(a)) may also be obtained by stacking a plurality of gypsum board pieces 13a' that are cut out to have a halved ring shaped planar shape such that vertically adjacent gypsum board pieces 13a' are circumferentially staggered to form a plurality of divided fireproof covering materials 12', and unitarily connecting the divided fireproof covering materials 12' in the circumferential direction.

In the present embodiment, the fireproof covered structure 10 for a penetration part is formed by the tubular fireproof covering material 12, which is formed by unitarily connecting a plurality of annular gypsum board pieces 13a in the manner described above, being inserted into and attached to the penetration part 11 formed in the fireproof beam 20 so as to cover the inner circumferential surface of the penetration part 11. That is, as shown in FIGS. 1 and 2, the tubular fireproof covering material 12 formed in the manner described above is inserted into and disposed in the penetration part 11 formed to extend through the fireproof beam 20 and has a hollow circular cross section with an inner diameter of, for example, about 200 mm such that the fourth and eighth connecting portions 15 out of eleven connecting portions 15 of adjacent annular gypsum board pieces 13a are disposed at two boundary portions 23 between the structural member 21 and the covering members 22 of the fireproof beam 20, or at portions close to the boundary portions 23. Also, the tubular fireproof covering material 12 is fixed to the penetration part 11 by filling a gap between the outer circumferential surface of the inserted tubular fireproof covering material 12 and the inner circumferential surface of the penetration part 11 with, for example, a fireproof putty or the like and solidifying the putty. After that, preferably, a gap at each end face of the tubular fireproof covering material 12 fixed to the penetration part 11 is filled with a fireproof putty or the like. Thus, the fireproof covered structure 10 for a penetration part of the present embodiment is formed.

In the present embodiment, a known floor member (not shown) that has predetermined fireproof performance is attached to the upper surface portion of the fireproof beam 20 so as to cover the upper surface of the fireproof beam 20, and thus the structural member 21 is not affected by heat from the upper surface side in case of a fire. Accordingly, even when a fireproof covering material is not provided on the upper surface portion of the fireproof beam 20, it is possible to effectively prevent a situation in which the structural member 21 is burnt and damaged or thermally degraded.

Also, with the fireproof covered structure 10 for a penetration part according to the present embodiment configured as described above, a tubular fireproof covering material 12 that is to be installed in a penetration part 11 and function as a firestop layer can be formed accurately and economically, and therefore the fireproof covered structure 10 for a penetration part can be formed easily and at a low cost.

That is, according to the present embodiment, in the fireproof covered structure 10 for a penetration part, the tubular fireproof covering material 12 that is inserted and disposed in the penetration part 11 formed in the fireproof beam 20 while covering the inner circumferential surface of the penetration part 11 is formed to have a tubular shape by stacking a plurality of annular gypsum board pieces 13a in the thickness direction and unitarily connecting the gypsum board pieces 13a. Accordingly, the tubular fireproof covering material 12 can be formed accurately and economically by preferably accurately cutting out a plurality of annular gypsum board pieces 13a from commercially available inexpensive gypsum boards 13 of thicknesses of 9.5 mm to 25.5 mm, without making a tubular molding mold each time, and stacking the plurality of annular gypsum board pieces 13a. At the same time, the fireproof covered structure 10 for a penetration part can be formed easily and at a low cost with a simple operation of installing the formed tubular fireproof covering material 12 in the penetration part 11 and fixing the tubular fireproof covering material 12 to the penetration part 11.

Also, in the present embodiment, the tubular fireproof covering material 12 is preferably formed by stacking a plurality of annular gypsum board pieces 13a and unitarily connecting the gypsum board pieces 13a through fixation using staples, and attached to the penetration part 11 such that two connecting portions 15 out of the connecting portions 15 that connect the annular gypsum board pieces 13a that are adjacent in the stacking direction are disposed at the two boundary portions 23 between the structural member 21 and the covering members 22 of the fireproof beam 20, or at portions close to the boundary portions 23. With this configuration, for example, even if height differences are generated at the boundary portions 23 in the penetration part 11 due to differences in behavior caused when the structural member 21 and the covering members 22 dry and contract, and differences in behavior caused when they support a load, the generated height differences are absorbed because adjacent annular gypsum board pieces 13a are displaced on both sides of the connecting portions 15 provided at the boundary portions 23 or portions close to the boundary portions 23, and it is therefore possible to effectively avoid a situation in which the tubular fireproof covering material 12 is likely to crack and is likely to no longer function as a firestop layer.

Figure 5:
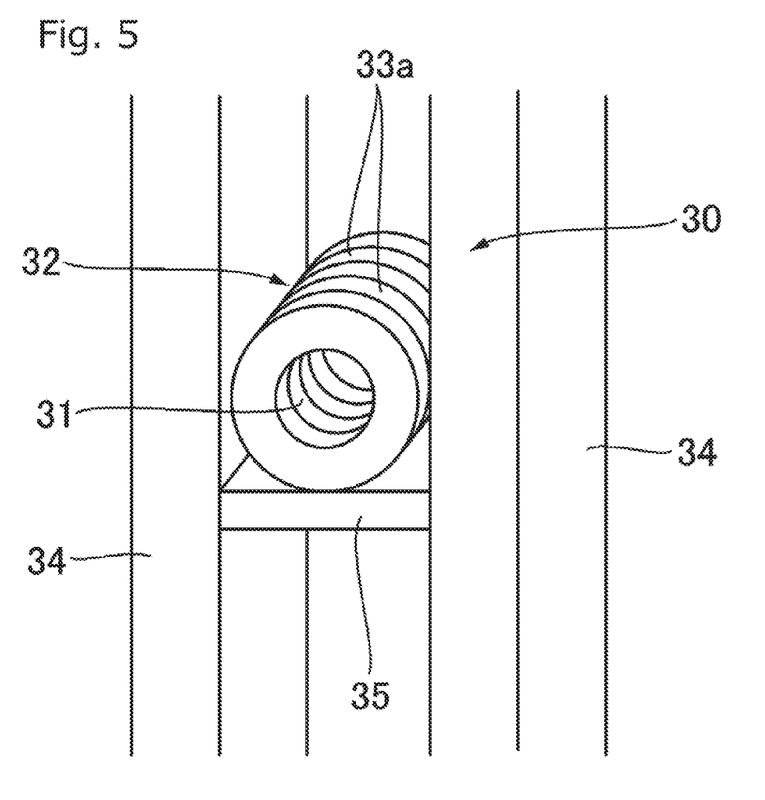
FIG. 5 is a schematic perspective view showing an example of a state in which a penetration part covered for fireproof is formed in a wall portion that is a fire prevention section forming member.

FIG. 5 shows an example of a fireproof covered structure 30 for a penetration part according to another preferred embodiment of the present invention. The fireproof covered structure 30 for a penetration part of the present embodiment is provided as a structure for covering a penetration part 31 to make it fireproof, the penetration part 31 being formed in a wall that has a fireproof structure and serves as a fire prevention section forming member in a wooden building. That is, in the fireproof covered structure 30 for a penetration part of the present embodiment, the tubular fireproof covering material 32 that preferably has a cylindrical shape and is formed by stacking, as gypsum board pieces, a plurality of ring-shaped annular gypsum board pieces 33a in the thickness direction, the gypsum board pieces 33a being preferably formed from gypsum boards of thicknesses of 9.5 mm to 25.5 mm, and unitarily connecting the gypsum board pieces 33a is placed on and fixed to a support table 35 that is attached by being supported by posts or studs 34 that constitute the wall having the fireproof structure, and thus, the penetration part 31 formed by the cylindrical tubular fireproof covering material 32 is provided extending through the wall having the fireproof structure. Accordingly, this means that the tubular fireproof covering material 32 is attached to the penetration part 31, which is formed by the tubular fireproof covering material 32, while covering the inner circumferential surface of the penetration part 31.

In the embodiment shown in FIG. 5, after the tubular fireproof covering material 32 is attached, known wall surface materials having predetermined fireproof performance are attached to the front and back sides of the wall by being supported by the posts or studs 34. Thus, a wall having a fireproof structure is formed in which the penetration part 31 formed by the tubular fireproof covering material 32 is provided.

With the fireproof covered structure 30 for a penetration part of the present embodiment as well, the tubular fireproof covering material 32 that forms the penetration part 31 is formed to have a tubular shape by stacking a plurality of annular gypsum board pieces 33a in the thickness direction, the gypsum board pieces 33a being formed from gypsum boards of thicknesses of 9.5 mm to 25.5 mm, and unitarily connecting the gypsum board pieces 33a. Accordingly, advantageous effects that are the same as those of the fireproof covered structure 10 for a penetration part of the above-described embodiment can be obtained.

Figure 6:
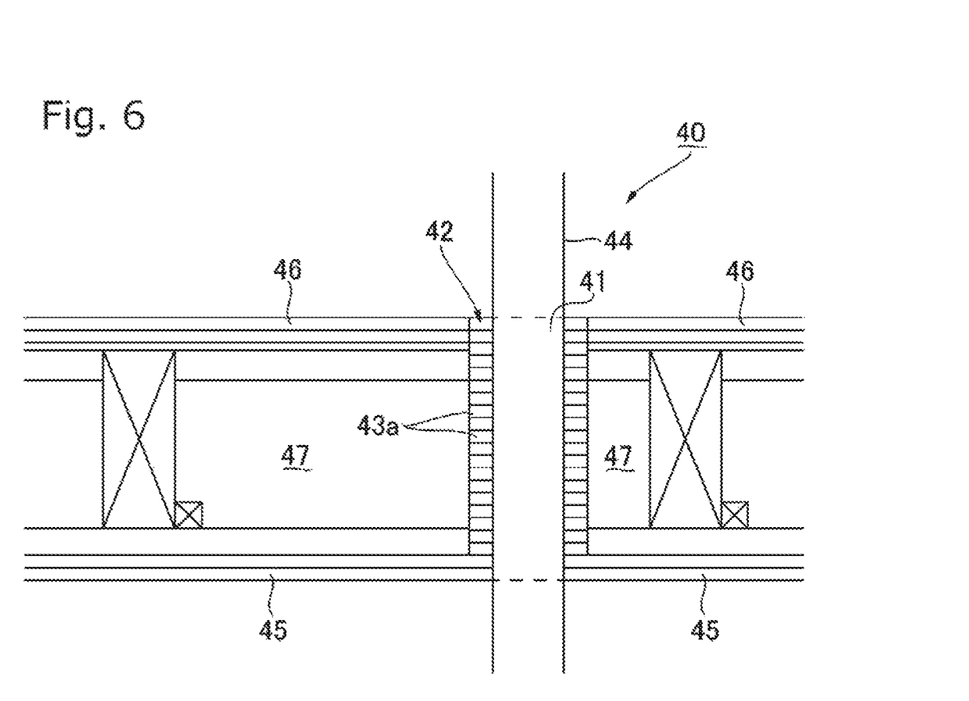
FIG. 6 is a schematic perspective view showing an example of a state in which a penetration part covered for fireproof is formed in a ceiling portion that is a fire prevention section forming member.

FIG. 6 shows an example of a fireproof covered structure 40 for a penetration part according to yet another preferred embodiment of the present invention. The fireproof covered structure 40 shown in FIG. 6 is provided as a structure for covering a penetration part 41 to make it fireproof, the penetration part 41 being formed in, i.e., through, a ceiling (or floor) that has a fireproof structure and serves as a fire prevention section forming member in a wooden building. A pipe 44 is passed through the penetration part 41 to extend between upper and lower floors. That is, in the fireproof covered structure 40 of the present embodiment, a tubular fireproof covering material 42 that preferably has a cylindrical shape and is formed by stacking, as gypsum board pieces, a plurality of ring-shaped annular gypsum board pieces 43a in the thickness direction, the gypsum board pieces 43a being preferably formed from gypsum boards of thicknesses of 9.5 mm to 25.5 mm, and unitarily connecting the gypsum board pieces 43a is inserted in a ceiling void portion 47 between a fireproof ceiling member 45 of the lower floor and a fireproof floor member 46 of the upper floor so as to extend from the ceiling member 45 to the floor member 46, and thus, the penetration part 41 formed by the cylindrical tubular fireproof covering material 42 is provided extending through the space between the ceiling member 45 of the lower floor and the floor member 46 of the upper floor. Accordingly, this means that, the tubular fireproof covering material 42 is attached at its ends to the floor members 45 and 46, so that the tubular fireproof covering material 42 provides the inner circumferential surface of the penetration part 41.

With the fireproof covered structure 40 for a penetration part shown in FIG. 6 as well, the tubular fireproof covering material 42 that forms the penetration part 41 is formed to have a tubular shape by stacking a plurality of annular gypsum board pieces 43a in the thickness direction, the gypsum board pieces 43a being formed from gypsum boards of thicknesses of 9.5 mm to 25.5 mm, and unitarily connecting the gypsum board pieces 43a. Accordingly, advantageous effects that are the same as those of the fireproof covered structure 10 for a penetration part of the above-described embodiment can be obtained.

The present invention is not limited to the embodiments described above, and various modifications can be made. For example, the gypsum board pieces are not necessarily ring-shaped annular gypsum board pieces, and may be annular gypsum board pieces of any other shape or gypsum board pieces that can be connected to form an annular shape. The tubular fireproof covering material is not necessarily a cylindrical fireproof covering material, and may be a tubular fireproof covering material of any other shape such as a rectangular tubular shape. The fireproof constructional member in which a penetration part is formed is not necessarily a fireproof beam that includes a structural member that serves as a load supporting layer and a pair of covering members that serve as burning margin layers, and may be any other constructional member that includes a structural member that serves as a load supporting layer and a covering member that is disposed to cover a surface of the structural member and serves as a burning margin layer or a firestop layer or both, and has a penetration part that is opened to intersect a boundary portion between the structural member and the covering member. In this case, the tubular fireproof covering material that is formed by preferably stacking annular gypsum board pieces can be inserted into and attached to the penetration part such that a connecting portion that connects annular gypsum board pieces that are adjacent to one another in the stacking direction is disposed at the boundary portion between the structural member and the covering member, or at a portion close to the boundary portion.

INDUSTRIAL APPLICABILITY

With the fireproof covered structure for penetration part according to the present invention, a tubular fireproof covering material that is to be installed in a penetration part and function as a firestop layer can be formed accurately and economically, and therefore the fireproof covered structure for penetration part can be formed easily and at a low cost.

The invention claimed is:

1. A fireproof covered structure for a penetration part having a length through one of a fire prevention section forming member of a wooden building and a fireproof constructional member of the wooden building, to fireproof the penetration part, comprising:
a tubular fireproof material forming a continuous inner peripheral surface along substantially all of the length of the penetration part penetrating through the one of the fire prevention section forming member and the fireproof constructional member, the tubular fireproof material formed to have a tubular shape by stacking a plurality of gypsum board pieces in a thickness direction of the fire prevention section forming member and unitarily connecting the plurality of gypsum board pieces.

2. The fireproof covered structure according to claim 1, wherein the plurality of gypsum board pieces are annular gypsum board pieces.

3. The fireproof covered structure according to claim 2, wherein the plurality of gypsum board pieces are cut out from gypsum boards of thicknesses of 9.5 mm to 25.5 mm.

4. The fireproof covered structure according to claim 3, wherein the plurality of gypsum board pieces are stacked and unitarily connected to form the tubular fireproof material by being fixed to each other using metal fasteners.

5. The fireproof covered structure according claim 4, wherein the gypsum board pieces are ring-shaped gypsum board pieces, and the tubular fireproof material is a cylindrical fireproof material.

6. The fireproof covered structure according to claim 5, wherein
the fireproof constructional member includes a structural member that serves as a load supporting layer and a covering member that is disposed to cover a surface of the structural member and serves as a burning margin layer,
the penetration part is opened to intersect a boundary portion between the structural member and the covering member, and
the tubular fireproof material that is formed by stacking the gypsum board pieces is inserted into and attached to the fireproof constructional member such that a connecting portion that connects the gypsum board pieces that are adjacent to one another in a stacking direction is disposed at the boundary portion between the structural member and the covering member, or at a portion close to the boundary portion.

7. The fireproof covered structure according to claim 6, wherein
the fireproof constructional member is a fireproof beam,
the fireproof beam includes the structural member that serves as the load supporting layer and a pair of covering members that are disposed to cover two side faces of the structural member and serve as burning margin layers, the penetration part being opened to intersect two boundary portions between the structural member and the covering members, and
the tubular fireproof material that is formed by stacking the gypsum board pieces is inserted into and attached to the fireproof constructional member such that two connecting portions that connect the gypsum board pieces that are adjacent to one another in the stacking direction are disposed at the two boundary portions between the structural member and the covering members, or at portions close to the two boundary portions.

8. The fireproof covered structure according to claim 3, wherein the gypsum board pieces are ring-shaped gypsum board pieces, and the tubular fireproof material is a cylindrical fireproof material.

9. The fireproof covered structure according to claim 8, wherein
the fireproof constructional member includes a structural member that serves as a load supporting layer and a covering member that is disposed to cover a surface of the structural member and serves as a burning margin layer,
the penetration part is opened to intersect a boundary portion between the structural member and the covering member, and
the tubular fireproof material that is formed by stacking the gypsum board pieces is inserted into and attached to the fireproof constructional member such that a connecting portion that connects the gypsum board pieces that are adjacent to one another in a stacking direction is disposed at the boundary portion between the structural member and the covering member, or at a portion close to the boundary portion.

10. The fireproof covered structure according to claim 9, wherein
the fireproof constructional member is a fireproof beam,
the fireproof beam includes the structural member that serves as the load supporting layer and a pair of covering members that are disposed to cover two side faces of the structural member and serve as burning margin layers, the penetration part being opened to intersect two boundary portions between the structural member and the covering members, and
the tubular fireproof material that is formed by stacking the gypsum board pieces is inserted into and attached to the fireproof constructional member such that two connecting portions that connect the gypsum board pieces that are adjacent to one another in the stacking direction are disposed at the two boundary portions between the structural member and the covering members, or at portions close to the two boundary portions.

11. The fireproof covered structure according to claim 2, wherein the gypsum board pieces are ring-shaped gypsum board pieces, and the tubular fireproof material is a cylindrical fireproof material.

12. The fireproof covered structure according to claim 11, wherein
the fireproof constructional member includes a structural member that serves as a load supporting layer and a covering member that is disposed to cover a surface of the structural member and serves as a burning margin layer,
the penetration part is opened to intersect a boundary portion between the structural member and the covering member, and
the tubular fireproof material that is formed by stacking the gypsum board pieces is inserted into and attached to the penetration part such that a connecting portion that connects the gypsum board pieces that are adjacent to one another in a stacking direction is disposed at the boundary portion between the structural member and the covering member, or at a portion close to the boundary portion.

13. The fireproof covered structure according to claim 12, wherein the fireproof constructional member is a fireproof beam,
the fireproof beam includes the structural member that serves as the load supporting layer and a pair of covering members that are disposed to cover two side faces of the structural member and serve as burning margin layers, the penetration part being opened to intersect two boundary portions between the structural member and the covering members, and
the tubular fireproof material that is formed by stacking the gypsum board pieces is inserted into and attached to the fireproof constructional member such that two connecting portions that connect the gypsum board pieces that are adjacent to one another in the stacking direction are disposed at the two boundary portions between the structural member and the covering members, or at portions close to the two boundary portions.

14. The fireproof covered structure according to claim 1, wherein the plurality of gypsum board pieces are cut out from gypsum boards of thicknesses of 9.5 mm to 25.5 mm.

15. The fireproof covered structure according to claim 14, wherein
the fireproof constructional member includes a structural member that serves as a load supporting layer and a covering member that is disposed to cover a surface of the structural member and serves as a burning margin layer,
the penetration part is opened to intersect a boundary portion between the structural member and the covering member, and
the tubular fireproof material that is formed by stacking the gypsum board pieces is inserted into and attached to the fireproof constructional member such that a connecting portion that connects the gypsum board pieces that are adjacent to one another in a stacking direction is disposed at the boundary portion between the structural member and the covering member, or at a portion close to the boundary portion.

16. The fireproof covered structure according to claim 15, wherein
the fireproof constructional member is a fireproof beam,
the fireproof beam includes the structural member that serves as the load supporting layer and a pair of covering members that are disposed to cover two side faces of the structural member and serve as burning margin layers, the penetration part being opened to intersect two boundary portions between the structural member and the covering members, and
the tubular fireproof material that is formed by stacking the gypsum board pieces being inserted into and attached to the fireproof constructional member such that two connecting portions that connect the gypsum board pieces that are adjacent to one another in the stacking direction are disposed at the two boundary portions between the structural member and the covering members, or at portions close to the two boundary portions.

17. The fireproof covered structure according to claim 1, wherein the plurality of gypsum board pieces are stacked and unitarily connected to form the tubular fireproof material by being fixed to each other using metal fasteners.

18. The fireproof covered structure according to claim 1, wherein the gypsum board pieces are ring-shaped gypsum board pieces, and the tubular fireproof material is a cylindrical fireproof material.

19. The fireproof covered structure according to claim 1, wherein the fireproof constructional member includes a structural member that serves as a load supporting layer and a covering member that is disposed to cover a surface of the structural member and serves as a burning margin layer, the penetration part is opened to intersect a boundary portion between the structural member and the covering member, and the tubular fireproof material that is formed by stacking the gypsum board pieces is inserted into and attached to the fireproof constructional member such that a connecting portion that connects the gypsum board pieces that are adjacent to one another in a stacking direction is disposed at the boundary portion between the structural member and the covering member, or at a portion close to the boundary portion.

20. The fireproof covered structure according to claim 19, wherein the fireproof constructional member is a fireproof beam, the fireproof beam includes the structural member that serves as the load supporting layer and a pair of covering members that are disposed to cover two side faces of the structural member and serve as burning margin layers, the penetration part being opened to intersect two boundary portions between the structural member and the covering members, and the tubular fireproof material that is formed by stacking the gypsum board pieces is inserted into and attached to the fireproof constructional member such that two connecting portions that connect the gypsum board pieces that are adjacent to one another in the stacking direction are disposed at the two boundary portions between the structural member and the covering members, or at portions close to the two boundary portions.

\* \* \* \* \*